United States Patent [19]
Leopold et al.

[11] Patent Number: 6,064,859
[45] Date of Patent: *May 16, 2000

[54] TRANSMIT AND RECEIVE PAYLOAD PAIR AND METHOD FOR USE IN COMMUNICATION SYSTEMS

[75] Inventors: Raymond J. Leopold, Tempe; Peter A. Swan, Paradise Valley; Keith A. Olds, Mesa, all of Ariz.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/743,121
[22] Filed: Nov. 4, 1996
[51] Int. Cl.[7] .............................. H04B 7/185; H04Q 7/20
[52] U.S. Cl. .......................................... 455/13.1; 455/427
[58] Field of Search .................................... 455/427, 430, 455/11.1, 12.1, 13.1, 13.3, 16; 370/316; 244/158 R

[56] References Cited

U.S. PATENT DOCUMENTS

| | | | |
|---|---|---|---|
| 2,748,266 | 5/1956 | Boyd | 455/11.1 |
| 5,187,805 | 2/1993 | Bertiger | 455/430 |
| 5,233,626 | 8/1993 | Ames | 455/13.1 |
| 5,615,407 | 3/1997 | Barkats | 455/13.1 |
| 5,722,042 | 2/1998 | Kimura et al. | 455/13.1 |
| 5,802,445 | 9/1998 | Wiedeman et al. | 455/427 |

*Primary Examiner*—Nguyen Vo
*Attorney, Agent, or Firm*—Sherry J. Whitney; James E. Klekotka

[57] ABSTRACT

Transmit, receive, and processing functions of a communication satellite are performed by two communication payload satellites. A transmit payload satellite (20) and a receive payload satellite (10) communicate via a crosslink (30,28) which provides the communication path between the two parts of the transmit and receive payload pair (50). The receive payload satellite (10) is optimized to perform substantially all of the receiving and processing functions required in space. The transmit payload satellite (20) is optimized to perform substantially all of the transmitting functions. The optimization process takes into account the location in space for the two separate payloads, where trade-offs are made with respect to electromagnetic signal interference issues, size, weight, power, and complexity.

23 Claims, 4 Drawing Sheets

TRANSMIT AND RECEIVE PAYLOAD PAIR AND METHOD FOR USE IN COMMUNICATION SYSTEMS

FIELD OF THE INVENTION

The present invention pertains to communication systems and, more particularly, to an apparatus and methods for transmitting signals to and receiving signals from payloads in communication systems.

BACKGROUND OF THE INVENTION

Satellites have the ability to provide line-of-sight communication paths to large geographical areas. Because of this, many different systems have been designed and are in various stages of development. These satellite based systems will provide communication and data services to a large number of mobile, portable and fixed subscriber equipment in many places around the world where users cannot presently be economically serviced by terrestrial based systems.

Modern satellite communication systems tend to use more than one satellite to fulfill their mission. Multiple satellites provide increased capacity, coverage and flexibility for the system. This multiplicity of satellites has led to the extensive use of inter-satellite links to provide system control and coordination. These relatively new factors in satellite systems provide opportunities to optimize the design of the satellites outside the traditional boundaries.

In the design of satellite communication systems, one of the concerns for system designers is the link performance. In general terms, the forward or reverse link performance is directly related to the power transmitted from the earth station or the satellite, the gains of the receiving antennas, path losses, and interference levels. Link gains which affect the satellite's configuration are provided by the on-board amplification and antennas. The transmitted power is a major design concern because it affects the mass and the primary power requirements of the satellite. Antenna size and configuration are also important considerations.

Other satellite considerations include transmitter duty cycle, modulation efficiency, power supply system conversion efficiency, heat dissipation, and temperature control. In general, any changes in these factors cause changes in the power output capability and usually correspond to an increase in the payload weight.

Satellites also have some form of thermal control to manage the temperature extremes. In a satellite, the temperature is controlled by balancing the amounts of radiated and absorbed energy. Internal inefficiencies in the components can generate heat, along with chemical reactions. External sources such as the sun also contribute to the heating of the satellite. Heat loss can be controlled by managing the emissivity of the satellite's surfaces.

The satellite system is a collection of multiple stage subsystems. In a most general view, the satellite system can be subdivided into a receive subsystem, a transmit subsystem, and a processing subsystem. What are needed are a method and apparatus which ensure more on-orbit capability by optimizing the hardware complexity, weight, power, and launch costs.

Interference is also a problem which must be dealt with by the satellite system designers. Interference can be due to other space-based transmitters or terrestrial-based transmitters. Interference can also be due to on-board sources. Therefore, what are also needed are a method and apparatus for minimizing interference problems.

BRIEF DESCRIPTION OF THE DRAWINGS

A more complete understanding of the present invention can be derived by referring to the detailed description and claims when considered in connection with the figures, wherein like reference numbers refer to similar items throughout the figures, and:

DETAILED DESCRIPTION OF A PREFERRED EMBODIMENT

The present invention describes a transmit and receive payload pair in which the transceiver portion of the communication satellite is separated into two satellite payloads, one for the transmit function and one for the receive and processing functions. The combination of a transmit payload satellite and a receive payload satellite is referred to herein as a "transmit and receive payload pair". The concept of transmit and receive payload pair, one for transmit and one for receive, allows system designers tremendous flexibility on size, weight, power, and complexity. The key is that complexity issues of receive and payload processing are physically separated from the thermal issues due to power dissipated during the associated transmitting of the communications signals. This optimization for thermal and payload complexity leads to tremendous savings in system level trades across the mission requirements to provide communication services.

Figure 1:
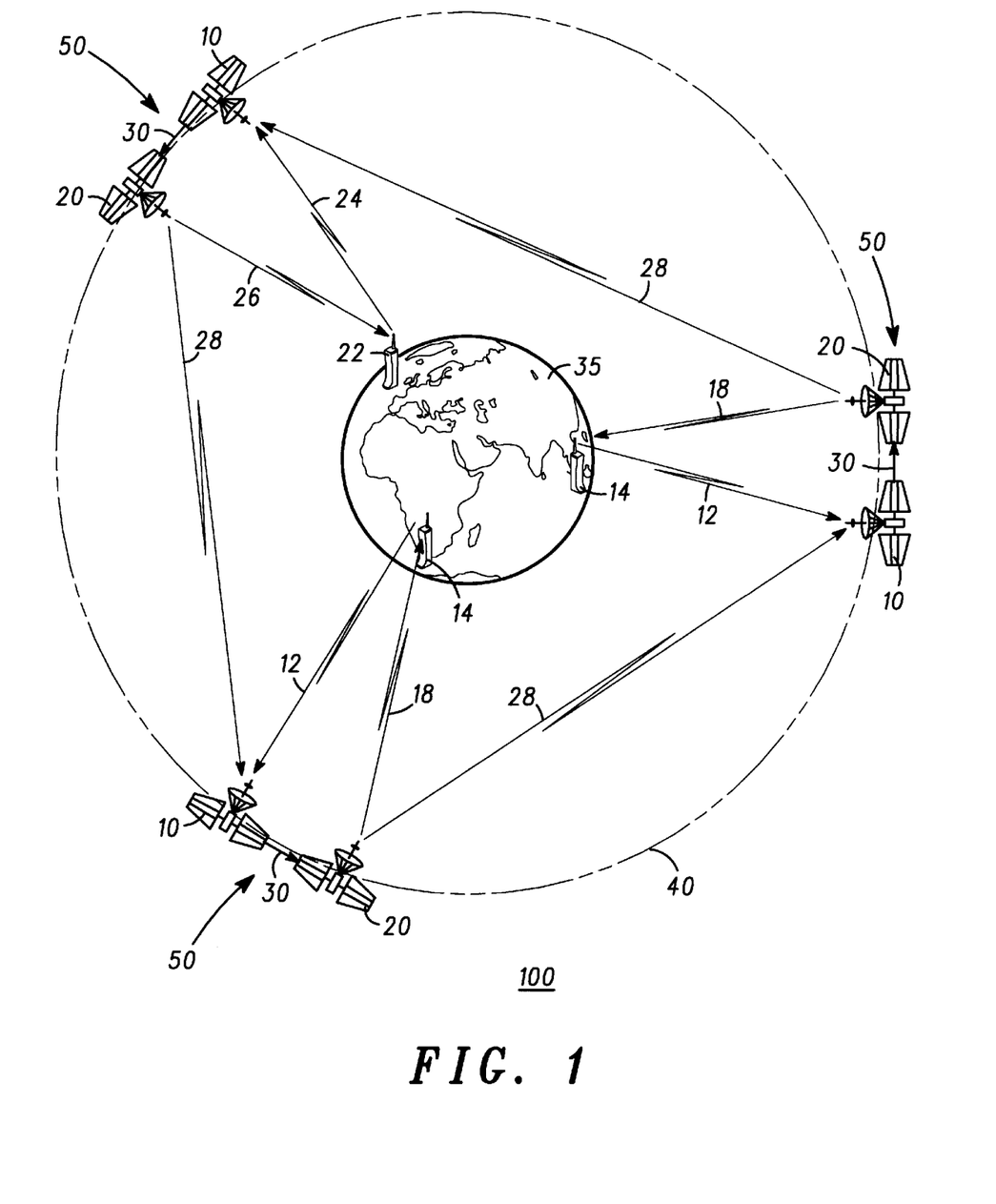
FIG. 1 shows a block diagram of a satellite communication system in which the space based communication facilities are provided by a transmit and receive payload pair in accordance with a preferred embodiment of the present invention.

FIG. 1 shows a block diagram of a satellite communication system 100 in which the space based communication facilities are provided by a transmit and receive payload pair 50 in accordance with a preferred embodiment of the present invention. As shown in FIG. 1, satellite communication system 100 contains multiple transmit and receive payload pairs 50. Long crosslink communication channels between different transmit and receive payload pairs 50 are provided by long crosslinks 28. A long crosslink communication channel 28 is a unidirectional path from a first crosslink device on a transmit payload satellite to a second crosslink device on a receive payload satellite. When transmitting and receiving communication units 14 are not serviced by the same payload pair 50, a uni-directional data path from a transmit payload satellite 20 in one transmit and receive payload pair 50 to a receive payload satellite 20 in another transmit and receive payload pair 50 is sufficient to provide communication services from one communication unit 14 to another communication unit 14. The long crosslink communication channel 28 can be provided by electromagnetic signal means or laser signal means. Additional data sent on long crosslink 28 is used to control and coordinate the operation of receive satellite 10 and transmit satellite 20. Long crosslink 28 is primarily used to transfer received communication service data from one transmit and receive payload pair 50 to another transmit and receive payload pair 50 so that the communication service data can be transmitted from one communication unit 14 to another communication unit 14.

At least one uplink communication channel is provided via uplink 12 from communication units 14 that are located proximate to the surface of the earth 35 to an uplink device on receive payload satellite 10. An uplink communication channel is provided by electromagnetic signal means or laser signal means. In FIG. 1, only two communication units 14 and only two uplinks 12 are shown to simplify the explanation of the preferred embodiment shown. Those skilled in the art will recognize that any number of communication units 14 and uplinks 12 are possible.

At least one downlink communication channel is provided via downlink 18 from a downlink device on transmit payload satellite 20 to communication units 14 that are located proximate to the surface of the earth 35. A downlink communication channel is provided by electromagnetic signal means or laser signal means. In FIG. 1, only two communication units 14 and only two downlinks 18 are shown to simplify the explanation of the preferred embodiment shown. Those skilled in the art will recognize that any number of communication units 14 and downlinks 18 are possible.

Those skilled in the art will also recognize that a communication unit in a communication system may, from time to time, perform functions of both a transmitting device and a receiving device or change from a transmitting device to a receiving device and vice versa. These changes are usually controlled by a processor. A communication unit can be, for example, a hand-held, portable cellular telephone adapted to transmit data to and/or receive data from transmit and receive payload pair 50. A communication unit can also be a facsimile device, pager, data terminal, or any other type of communication device.

A communication unit 14, which has been adapted to operate with said transmit and receive payload pair 50, comprises a transmitting device for transmitting uplink signals on at least one uplink communication channel 24 to at least one transmit and receive payload pair 50, a receiving device for receiving downlink signals on at least one downlink communication channel 18 from at least one transmit and receive payload pair 50, and a processor which is coupled to both the transmitting device and the receiving device and which is used for controlling the transmitting device, the receiving device and the communication unit 14.

Receive payload satellite 10 also has a communication channel with transmit payload satellite 20 via short crosslink 30. Short crosslink 30 provides at least one short crosslink communication channel for passing data between the two parts of transmit and receive payload pair 50. A short crosslink communication channel 30 is primarily a unidirectional path from a first crosslink device on a receive payload satellite 10 to a second crosslink device on a transmit payload satellite 20. In some embodiments, however, data can be sent in the reverse direction for various purposes such as maintaining communications, link synchronization, error control and recovery, or the like. A unidirectional data path from receive payload satellite 10 to transmit payload satellite 20 is sufficient to provide communication services from one communication unit 14 to another communication unit 14. The short crosslink communication channel 30 is provided by electromagnetic signal means, a signal-carrying cable means, or laser signal means. Additional data sent on short crosslink 30 is used to control and coordinate the operation of receive satellite 10 and transmit satellite 20. Short crosslink 30 is primarily used to transfer received communication service data from receive payload satellite 10 to transmit payload satellite 20 so that the communication service data may be transmitted to communication unit 14.

In a preferred embodiment of the present invention, the two payload satellites in transmit receive payload pair 50 fly in the same orbital plane 40 with a small orbital phase difference that has a lead/follow orientation with a short distance between the payload satellites. In another embodiment, the two payload satellites in transmit and receive payload pair 50 are in separated orbital planes with the same or different angle of inclination. In other embodiments, receive payload satellite 10 and transmit payload satellite 20 are widely separated; however, constant line of sight is necessary for crosslinking.

Referring again to FIG. 1, a command channel is established via command link 24 from system control center 22 to receive payload satellite 10, and a telemetry channel is established via telemetry link 26 from transmit payload satellite 20 to system control center 22. System control center 22 controls operation of satellite communication system 100 and provides telemetry, tracking and control (TT&C) signals for transmit and receive payload pair 50. Telemetry, tracking and control signals are key service features which should be provided to each satellite. The telemetry function is desirable to provide a way to monitor and evaluate the satellites' performance. The command function is desirable to provide a way to control satellite operation. The tracking function is desirable to perform orbit corrections.

In a preferred embodiment such as shown in FIG. 1, with respect to system control center 22, unidirectional links are shown in a direction toward receive payload satellite 10 and from transmit payload satellite 20. A uni-directional link is also shown for short crosslink 30. Short crosslink 30 provides the necessary transmission path for the communication service data and the telemetry, tracking and control signals between the two payloads. For example, TT&C signals can be transmitted via command link 24 to receive payload satellite 10, between receive payload satellite 10 and transmit payload satellite 20 via short crosslink 30, and can be retransmitted to earth 35 from transmit payload satellite 20 via telemetry link 26. In addition, some TT&C signals can be transmitted from transmit payload satellite 20 to receive payload satellite 10 by using telemetry link 26, system control center 22, and command link 24. In an alternate embodiment, transmit payload satellite 20 can send information directly to receive payload satellite 10.

Figure 2:
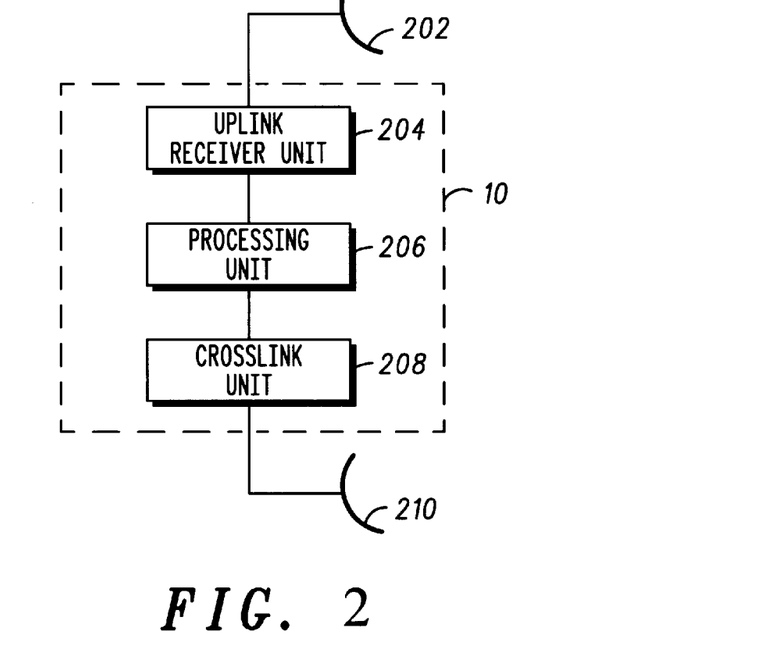
FIG. 2 shows a block diagram for a receive payload satellite in a transmit and receive payload pair in accordance with a preferred embodiment of the present invention.

FIG. 2 shows a block diagram for a receive payload satellite 10 (FIG. 1) in a transmit and receive payload pair 50 (FIG. 1) in accordance with a preferred embodiment of the present invention. Uplink antenna 202 is used to receive signals from communication units 14 (FIG. 1) and from system control center 22 (FIG. 1). It will be understood that while each receive payload satellite 10 is illustrated in FIG. 2 as having a single uplink antenna 202, each uplink antenna 202 will typically comprise several antennas, so that receive payload satellite 10 can communicate with more than one communication unit at a time and with system control center 22 (FIG. 1). Those skilled in the art will appreciate that instead of a bank of discrete, uni-directional antennas, uplink antenna 202 can be implemented as a single, phased-array antenna or a combination of unidirectional antennas and phased-array antennas. In a preferred embodiment, uplink antenna 202 is an uplink device for signal reception that has been optimized to operate in a receive-only mode and when positioned in a particular earth orbit. For example, the size of the antenna is more closely determined because it only has to function in a receive mode in a geosynchronous orbit.

Uplink antenna 202 is coupled to uplink receiver unit 204 which can contain a low noise amplifier (LNA) and elements to control the operation of uplink antenna 202. Uplink receiver unit 204 is used to convert and demodulate the signals received from uplink antenna 202 to signals which can be sent to processing unit 206. In a preferred embodiment, uplink receiver unit 204 performs substantially all space-based receiving functions that are required to provide said communication services. In a preferred embodiment, uplink receiver unit 204, has been adapted to operate while positioned in a particular earth orbit. For example, receiver sensitivity could be affected by the distance between receive payload satellite 10 and transmit payload satellite 20.

Processing unit 206 desirably performs all of the functions required to process data that is transmitted to receive payload satellite 10 (FIG. 1). Processing unit 206 is coupled to crosslink unit 208. Also, processing unit 206 desirably performs all of the functions required to provide data to crosslink unit 208 for transmission to transmit payload satellite 20 (FIG. 1). Crosslink unit 208 is coupled to crosslink antenna unit 210 and can contain elements to control the operation of crosslink antenna unit 210. Crosslink unit 208 can provide just transmitting elements, just receiving elements, or elements to separate transmitted and received signals. Crosslink unit 208 can be a crosslink transmitter unit, a crosslink receiver unit or a crosslink transceiver unit.

Crosslink antenna unit 210 is coupled to crosslink unit 208 and provides the transmission means to transmit crosslink signals to transmit payload satellite 20 (FIG. 1). It will be understood that while receive payload satellite 10 illustrated in FIG. 2 has a single crosslink antenna unit 210, each crosslink antenna unit 210 can comprise several antenna elements, so that receive payload satellite 10 (FIG. 1) can communicate with more than one other transmit payload satellite at a time. Those skilled in the art will appreciate that instead of a bank of discrete, uni-directional antennas, crosslink antenna unit 210 can be implemented as a single multi-beam, phased-array antenna or a combination of uni-directional and phased-array antennas.

In an alternate embodiment of the present invention, crosslink antenna unit 210 could also provide the reception means to receive crosslink signals from transmit payload satellite 20 (FIG. 1). In an alternate embodiment, crosslink unit 208 could be used to convert the crosslink received signals into crosslink received data which is processed by processing unit 206. As an example, this crosslink received data could be used for synchronization and TT&C functions.

Processing unit 206 provides control signals to uplink antenna 202, uplink receiver unit 204, crosslink unit 208, and crosslink antenna unit 210. Processing unit 206 receives status signals from uplink antenna 202, uplink receiver unit 204, crosslink unit 208, and crosslink antenna unit 210. Processing unit 206 provides all of the on-board processing functions for receive payload satellite 10 and substantially all of the processing functions for transmit payload satellite 20. These functions can include but are not limited to modulation, demodulation, decoding, switching, timing, storing, coding, controlling and processing. Although only one processing unit 206 is shown in FIG. 2, multiple processing units could be used to perform these functions.

Figure 3:
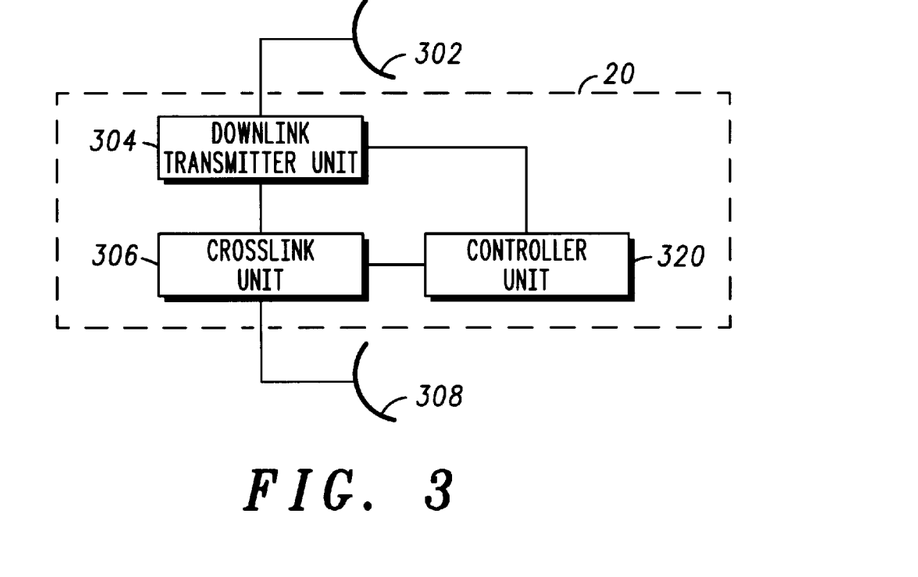
FIG. 3 shows a block diagram for a transmit payload satellite in a transmit and receive payload pair in accordance with a preferred embodiment of the present invention.

FIG. 3 shows a block diagram for a transmit payload satellite 20 in transmit and receive payload pair 50 (FIG. 1) in accordance with a preferred embodiment of the present invention. Downlink antenna 302 is used to transmit signals to communication units 14 (FIG. 1) and to system control center 22 (FIG. 1). It will be understood that while transmit payload satellite 20 illustrated in FIG. 3 has a single downlink antenna 302, each downlink antenna 302 will typically comprise several antennas, so that transmit payload satellite 20 can communicate with more than one communication unit 14 (FIG. 1) at a time and with system control center 22 (FIG. 1). Those skilled in the art will appreciate that instead of a bank of discrete, uni-directional antennas, downlink antenna 302 can be implemented as a single, phased-array antenna or a combination of uni-directional antennas and phased-array antennas. In a preferred embodiment, downlink antenna 302 is a downlink device for signal distribution that has been optimized to operate in a transmit-only mode and positioned in a particular earth orbit. For example, the size of the antenna is more closely determined because it only has to function in a transmit mode in non-geosynchronous orbits.

Downlink antenna 302 is coupled to downlink transmitter unit 304 which can contain a high power amplifier and elements to control the operation of downlink antenna 302 and the high power amplifier. Downlink transmitter unit 304 is used to convert and remodulate data signals received from crosslink unit 306 onto signals which are sent to downlink antenna 302. Crosslink unit 306 performs all of the functions required to process data that was transmitted from receive payload satellite 10 (FIG. 1). Crosslink unit 306 can provide just transmitting elements, just receiving elements, or elements to separate transmitted and received signals. Crosslink unit 306 can be a crosslink transmitter unit, a crosslink receiver unit or a crosslink transceiver unit. Crosslink unit 306 is coupled to crosslink antenna unit 308 and can contain elements to control the operation of crosslink antenna unit 308.

Crosslink antenna unit 308 provides a reception means to receive crosslink signals from receive payload satellite 10 (FIG. 1). It will be understood that while transmit payload satellite 20 illustrated in FIG. 2 has a single crosslink antenna unit 308, each crosslink antenna unit 308 will typically comprise several antenna elements, so that transmit payload satellite 20 (FIG. 1) can communicate with more than one other receive payload satellite at a time. Those skilled in the art will appreciate that instead of a bank of discrete, uni-directional antennas, crosslink antenna unit 308 can be implemented as a single phased-array antenna or a combination of uni-directional and phased-array antennas.

Controller unit 320 is coupled to downlink transmitter unit 304 and crosslink unit 306. Controller unit 320 provides control signals to downlink antenna 302, downlink transmitter unit 304, crosslink unit 306, and crosslink antenna unit 308. Controller unit 320 obtains status signals from downlink antenna 302, downlink transmitter unit 304, crosslink unit 306, and crosslink antenna unit 308.

Figure 4:
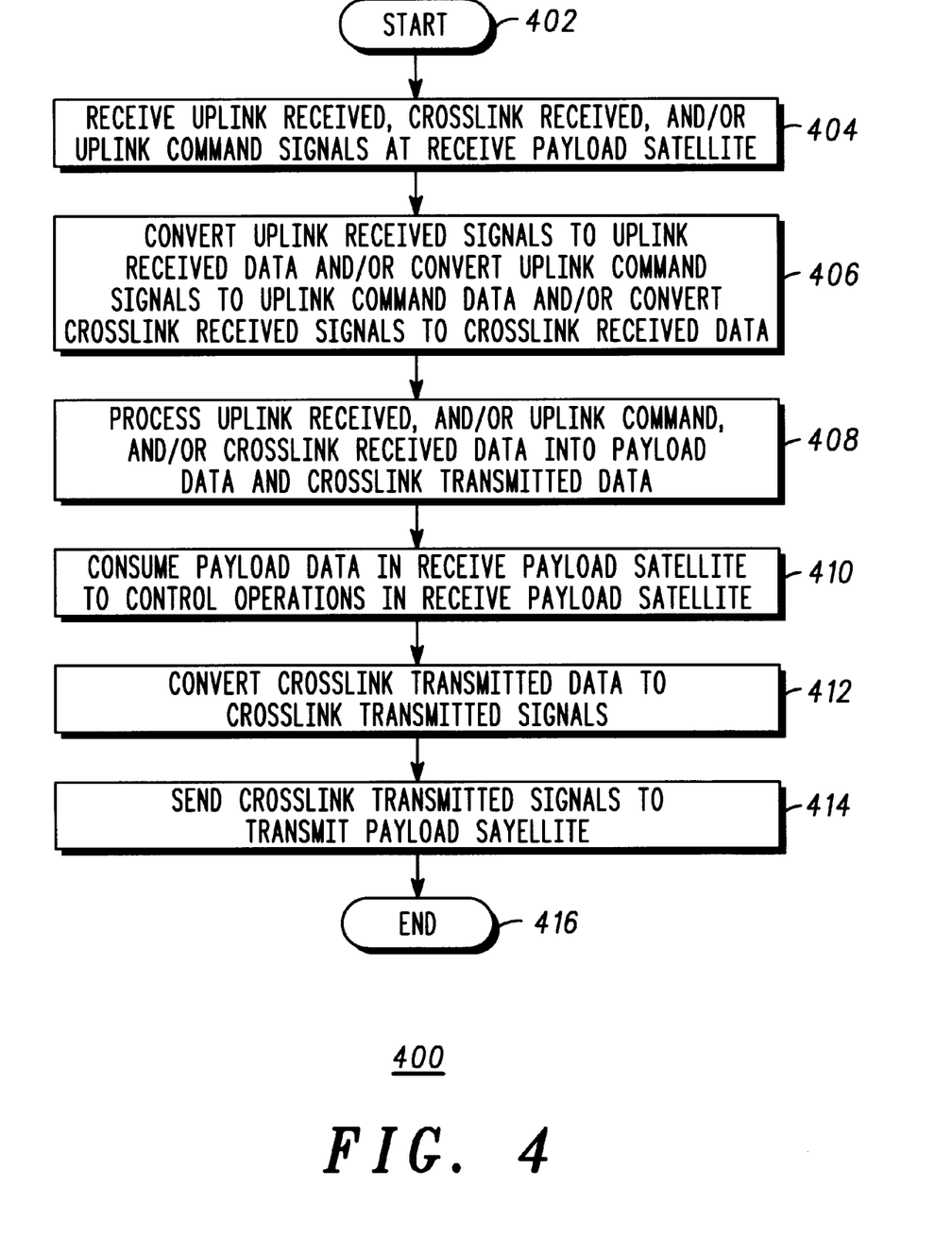
FIG. 4 shows a flow chart for a method for using a receive payload satellite in a transmit and receive payload pair in accordance with a preferred embodiment of the present invention.

FIG. 4 shows a flow chart for a method for using a receive payload satellite in a transmit and receive payload pair in accordance with a preferred embodiment of the present invention. Procedure 400 starts in step 402. In step 404, signals are received by receive payload satellite 10 (FIG. 1). The received signals can originate from many different sources including but not limited to communication units. The frequency range for the received signals can be from RF to light depending on the nature of the communication system.

Some of the received signals are received on uplink 12 (FIG. 1) from communication units 14 (FIG. 1) and these signals are identified as uplink received signals. Some of the received signals are received on long crosslink 28 (FIG. 1) from transmit payload satellites 20 and these signals are identified as crosslink received signals. Some of the received signals are received on command link 24 from system control centers 22 and these signals are identified as uplink command signals. In a preferred embodiment of the present invention, the crosslink received signals originate from transmit payload satellite 20 (FIG. 1) which is not associated with this receive payload satellite 10 (FIG. 1) in the transmit and receive payload pair 50 (FIG. 1). In alternate embodiments, the crosslink received signals can originate from any one of a number of other payloads.

In step 406, the received signals are converted to received data. Conversion processes include but are not limited to frequency conversion and demodulation. Received data packets are tagged with their destination. This can be done by system control center 22 (FIG. 1) or communication unit 14 (FIG. 1), or a tag can be attached by receive payload satellite 10 (FIG. 1). This tagging operation associates a tag with the data packet based on which channel, timeslot, frequency, code or other identifying means the data packet is associated with.

The received data can be uplink received data, crosslink received data, or uplink command data. The receiving device converts uplink received signals into uplink received data, converts crosslink received signals into crosslink received data, and converts uplink command signals into uplink command data.

In step 408, the received data is processed into payload data and crosslink transmitted data. The received data can contain but is not limited to call processing data, user data, and payload data. For example, call processing data can include data to begin a call, data to maintain an on-going call, and data to terminate a call. For example, user data can contain voice, paging, facsimile or other similar data. Crosslink transmitted data is data that is sent to transmit payload satellite 20 (FIG. 1). This data can contain but is not limited to data which is used by transmit payload satellite 20 (FIG. 1) to operate and data which is transmitted to communication units 14 (FIG. 1).

In step 410, the payload data is consumed by receive payload satellite 10 (FIG. 1). Payload data can contain but is not limited to control data, memory data, tracking data, program data, and call processing data. As an example, portions of the payload data are used to control the satellite's orientation in space. Other portions of the payload data are used to control both the uplink and crosslink antennas.

In step 412, the crosslink transmitted data packets are converted to crosslink transmitted signals. Conversion processes can include but are not limited to frequency conversion and modulation. Crosslink transmitted data packets are tagged with their destination. This is done by the communication unit or is attached by receive payload satellite 10 (FIG. 1). This tagging operation associates a tag with the data packet based on which channel, timeslot, frequency, code or other identifying means the data packet is associated with. The destination information is sent to transmit payload satellite 20 (FIG. 1) with the data packet. Transmit payload satellite 20 (FIG. 1) uses the destination information to decide which channel is used to transmit the downlink transmitted data.

In step 414, the crosslink transmitted signals are sent to transmit payload satellite 20 (FIG. 1) over a short crosslink communication channel 30 (FIG. 1) in a preferred embodiment. In an alternate embodiment, data transmissions are accomplished over a tether between receive payload satellite 10 (FIG. 1) and transmit payload satellite 20 (FIG. 1). In this alternate embodiment, the crosslink transmitted data packets would not have to be converted to crosslink transmitted signals. Procedure 400 ends with step 416.

Figure 5:
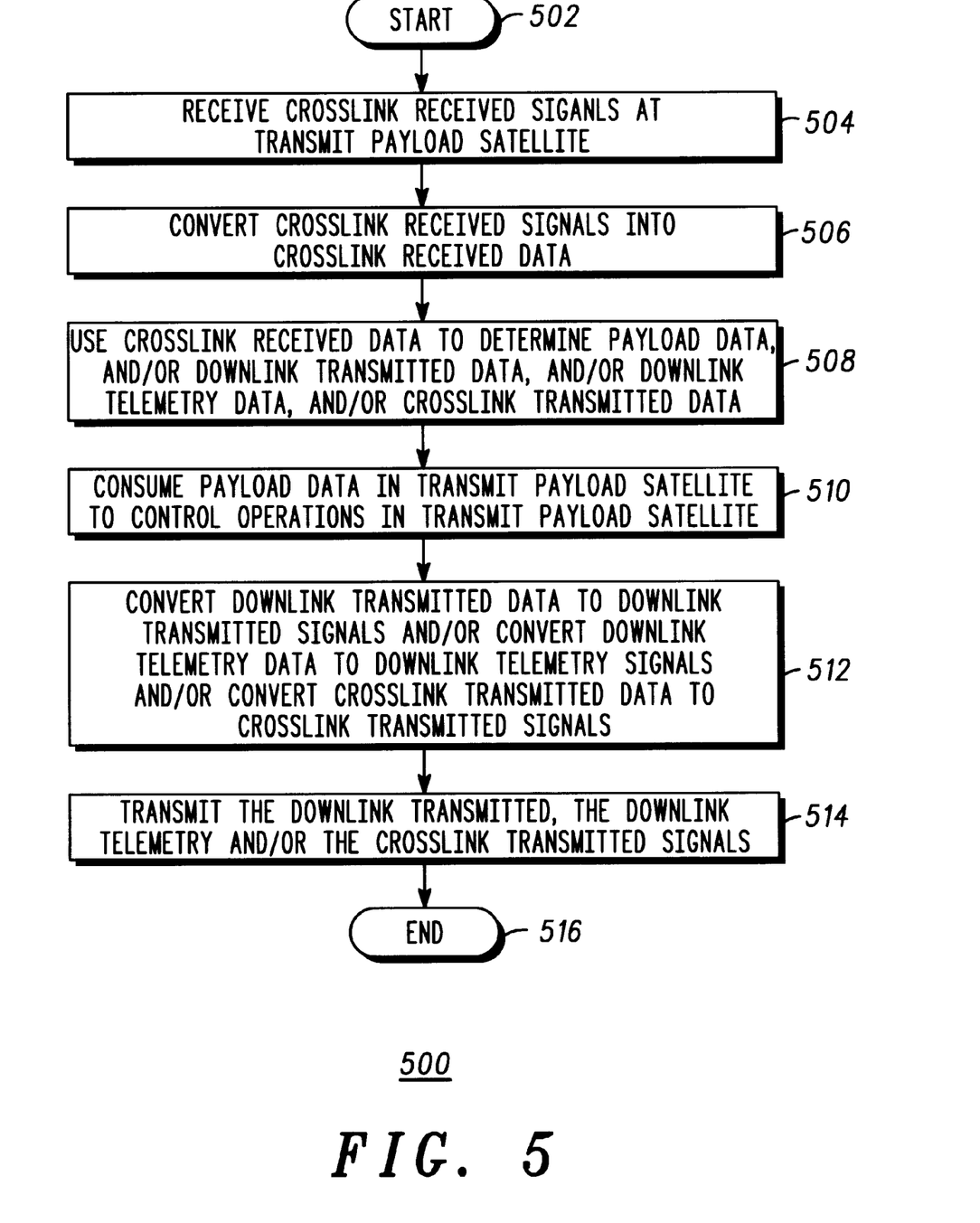
FIG. 5 shows a flow chart for a method for using a transmit payload satellite in a transmit and receive payload pair in accordance with a preferred embodiment of the present invention.

FIG. 5 shows a flow chart for a method for using a transmit payload satellite in a transmit and receive payload pair in accordance with a preferred embodiment of the present invention. Procedure 500 starts in step 502. In step 504, the crosslink transmitted signals are received by transmit payload satellite 20 (FIG. 1) in transmit and receive payload pair 50 (FIG. 1). In a preferred embodiment of the present invention, the crosslink transmitted signals originate from receive payload satellite 10 (FIG. 1) associated with this transmit payload satellite 20 (FIG. 1) in the transmit and receive payload pair 50 (FIG. 1). In alternate embodiments, the crosslink transmitted signals can originate from any one of a number of other payloads including but not limited to the receive payload satellite associated with this transmit payload satellite in the transmit and receive payload pair. In a preferred embodiment of the present invention, the crosslink transmission means is an RF signal means. In alternate embodiments, the frequency range for the crosslink signals are from RF to light depending on the nature of the communication system.

In step 506, the crosslink transmitted signals are converted to crosslink received data. Conversion processes can include but are not limited to frequency conversion and demodulation. Crosslink received data packets are tagged with their destination. This tagging operation associates a tag with the data packet based on which channel, timeslot, frequency, code or other identifying means the data packet is associated with.

In step 508, the crosslink received data is used to determine payload data and downlink transmitted data. The crosslink received data can contain but is not limited to call processing data, user data, and payload data. For example, call processing data can include data to begin a call, data to maintain an on-going call and, data to terminate a call. For example, user data can contain voice, paging, facsimile or other similar data. Portions of this crosslink received data can be instructional data which are used by transmit payload satellite 20 (FIG. 1) to modify its operations. For example, this data can be used by transmit payload satellite 20 (FIG. 1) to determine if any of this data should be stored or transmitted and on which radio channel the data should be transmitted.

Transmitted data are sent to communication units 14 (FIG. 1), to other transmit and receive payload pairs 50 (FIG. 1), and to system control center 22 (FIG. 1). Transmitted data that is sent to communication units 14 is identified as downlink transmitted data. Transmitted data that is sent to other transmit and receive payload pairs 50 is identified as crosslink transmitted data. Transmitted data that is sent to system control centers 22 is identified as downlink telemetry data.

In step 510, the payload data is consumed by transmit payload satellite 20 (FIG. 1). Payload data can contain but is not limited to control data, memory data, tracking data, program data, and call processing data. As an example, portions of the payload data are used to control the satellite's orientation in space. Other portions of the payload data are used to control both the downlink and crosslink antennas.

In step 512, the transmitted data is converted to transmitted signals by the downlink transmitting device. If downlink transmitted data is converted, then it is converted into downlink transmitted signals. If crosslink transmitted data is converted, then it is converted into crosslink transmitted signals. If downlink telemetry data is converted, then it is converted into downlink telemetry signals.

In step 514, the transmitted signals are transmitted. If the transmitted signals are downlink transmitted signals, then they are transmitted via the downlink communication channel which is provided via downlink 18 (FIG. 1) from transmit payload satellite 20 (FIG. 1) to communication units 14 (FIG. 1). If the transmitted signals are crosslink transmitted signals, they are transmitted via the long crosslink communication channel which is provided via long crosslink 28 (FIG. 1) from transmit payload satellite 20 (FIG. 1) to receive payload satellite 10 (FIG. 1). If the transmitted signals are downlink telemetry signals, they are transmitted via the telemetry channel which is provided via telemetry link 26 (FIG. 1) from transmit payload satellite 20 (FIG. 1) to system control center 22 (FIG. 1). Procedure 500 ends with step 516.

In a preferred embodiment of the present invention, the total systems approach to a pair of communication satellites are optimized if the on-board processing on receive payload satellite 10 (FIG. 1) is maximized while the processing load on transmit payload satellite (FIG. 1) 20 is minimized. This is achieved by optimizing a receive payload satellite to perform substantially all of the space-based receiving and processing functions and substantially none of the associated space-based transmitting functions; positioning a first number of receive payload satellites at a first number of first locations in orbits around the earth; providing at least one uplink communication channel between at least one of said number of receive payload satellites and at least one of said plurality of communication units; optimizing a transmit payload satellite to perform substantially all of the associated space-based transmitting functions and substantially none of the space-based receiving and processing functions; positioning a second number of transmit payload satellites at a second number of second locations in orbits around the earth; providing at least one downlink communication channel between at least one of the second number of transmit payload satellites and at least one of the plurality of communication units; and establishing at least one crosslink communication channel between at least one of the first number of receive payload satellites and at least one of the second number of transmit payload satellites so that data sent from a first communication unit is received by a second communication unit.

Using the apparatus and method of the present invention serves to balance the thermal and power requirements between the two satellites. Important to the concept is the optimization of the major segments of the payload into a receive and process portion and a high power transmit portion. The characteristics that are optimized using the transmit and receive payload pair are the thermal and heat flow aspects of the traveling wave tube amplifiers (TWTAs) and the complexity versus weight issue in the processor section. As an example, this could lead to the location of the on-orbit operations, such as the attitude and orbit control systems (AOCS) computation, being achieved on receive payload satellite 10. This could enable the power to be leveled with a dramatic reduction of computation on transmit payload satellite 20 (FIG. 1) and an increase in processing requirements on receive payload satellite 10 (FIG. 1). In addition, the major processor tasks (channel resource assignment, packet routing, and channel allocation) could be left to receive payload satellite 10 (FIG. 1) with the appropriate results transmitted to transmit payload satellite 20 (FIG. 1) via short crosslink 30 (FIG. 1). In addition, all of the inter-satellite link allocation could be achieved through receive payload satellite 10. As the feeder links are required, the allocation could be processed through receive payload satellite 10, but the transmission would occur through transmit payload satellite 20.

The separation of the receive and processor functions from the associated transmit functions provides major advantages on the electromagnetic interference (EMI) and electromagnetic compatibility (EMC) issues. Separating the functional elements, as shown in a preferred embodiment of the present invention, minimizes the EMI and EMC problems because the high power transmitter operations are physically separated from the sensitive receive operations.

The crosslink subsystems on both satellites do not require excessive power, resulting in receive payload satellite 10 (FIG. 1) being able to use its power to achieve communication services processing and transmit payload satellite 20 (FIG. 1) being able to concentrate its power toward sending the message to the user across significant distances. In addition, those skilled in the art will recognize that there is only a requirement for large uplink antennas on receive payload satellite 10 (FIG. 1), a requirement for large downlink antennas on transmit payload satellite 20 (FIG. 1), and a requirement for small crosslink antennas on both satellites.

In an alternate embodiment of the present invention, a number of transmit and receive payload pairs are organized into a communication system in which each pair covers a different area of the earth. In this embodiment, the transmit satellite of one pair could connect to the receive payload satellite of one or more other pairs via long range crosslinks. These long range crosslinks could be included in addition to crosslinks 30 (FIG. 1) that connect transmit payload satellite 20 (FIG. 1) and receive payload satellite 10 (FIG. 1) in transmit and receive payload pair 50 (FIG. 1).

Additional embodiments of the present invention are envisioned in which a number of receive payload satellites and different number of transmit payload satellites are grouped together. For example, one receive payload satellite could be used in cooperation with more than one transmit payload satellite to form a communication group. This could result, for example, where significant improvements are made in the receive and/or processing operations. In a second example, one transmit payload satellite could be used in cooperation with more than one receive payload satellite to form a different communication group. This could result, for example, where significant improvements are made in the transmit operations. These communication groups could also be used in communication systems in which each group covers a different area of the earth. In this embodiment, the transmit satellite of one group could connect to the receive payload satellite of one or more other groups via long range crosslinks. These long range crosslinks would be included in addition to crosslinks that connect transmit payload satellites and receive payload satellites in the communication groups.

Alternate embodiments of the present invention are applicable to all orbital types, to include, but not be limited to Low Earth Orbit (LEO), Medium Earth Orbit (MEO), Geosynchronous Earth Orbit (GEO), and Highly Elliptical Orbit (HEO). Satellite communication systems can be established using different numbers of receive payload satellites 10 (FIG. 1) and transmit payload satellites 20 (FIG. 1) in different orbits. For example, three receive payload satellites 10 (FIG. 1) could be put into geosynchronous orbits to control and communicate with more than three transmit payload satellites 20 (FIG. 1) in one or more non-geosynchronous orbits.

The large cost of launches and the major issues of frequency and interference coordination while in orbit provide further incentives to use a transmit and receive payload pair as a communication system resource. The cost of placing communications satellites in orbit is becoming very expensive due to the ever increasing size and complexity in response to the needs of the customer. A preferred embodiment of the present invention allows more capacity to be placed in orbit for less cost and complexity. Optimization of the communication system is an important result that is achieved by the method and application of this invention.

Separating the complexity of the receive and processing portion of the communication service mission from the transmission portion, which is the energy consuming portion of the communication service mission, is a technique that provides significant benefits when applied to a total system. The maturity of the communication satellite design process enables this optimization to occur, because the orbits are well understood, the required crosslink technology is well exercised, and the complexity of the payloads is being enhanced by faster and larger processors. The separation of these two subsystems onto separate satellite payloads strengthens the processing of the communications payload for such issues as single event upset robust software and sophisticated techniques for higher data rates.

The present invention has been described above with reference to a preferred embodiment. However, those skilled in the art will recognize that changes and modifications can be made in this preferred embodiment without departing from the scope of the present invention. For example, while a preferred embodiment has been described in terms of using specific numbers of payloads and orbital locations for configuring the transmit and receive pair, other descriptions or methods can also be employed. Accordingly, these and other changes and modifications which are obvious to those skilled in the art are intended to be included within the scope of the present invention.

What is claimed is:

1. In a satellite communication system which uses a plurality of transmit and receive payload pairs, which are coupled to each other via long crosslinks, to provide communication services to a plurality of communication units, a method of providing said communication services comprising the steps of:

configuring a first number of receive payload satellites having at least one antenna optimized to operate in a receive-only mode at first locations in orbits around the earth;

configuring a second number of transmit payload satellites having at least one antenna optimized to operate in a transmit-only mode at second locations in orbits around the earth, wherein said first locations and said second locations being chosen to separate high power transmitter operations associated with said transmit payload satellites from sensitive receive operations associated with said receive payload satellites;

positioning said first number of receive payload satellites at said first locations in orbits around the earth, wherein said first number of receive payload satellites are adapted to perform substantially only receiving functions and substantially none of the transmitting functions for uplink communication channels from said plurality of communication units, transmitting functions for short crosslink communication channels, receiving functions for long crosslink communication channels, and a first set of space-based processing functions;

establishing at least one uplink communication channel between a first receive payload satellite and a first communication unit;

positioning said second number of transmit payload satellites at said second locations in orbits around the earth, wherein said second number of transmit payload satellites are adapted to perform substantially only transmitting functions and substantially none of the receiving functions for downlink communication channels to said plurality of communication units, receiving functions for short crosslink communication channels, transmitting functions for long crosslink communication channels, and a second set of space-based processing functions;

establishing a first short crosslink from said first receive payload satellite to a first transmit payload satellite, said first short crosslink providing at least one short crosslink communication channel for passing data between said first transmit payload satellite and said first receive payload satellite, thereby forming a first transmit and receive payload pair;

establishing a second short crosslink from a second receive payload satellite to a second transmit payload satellite, said second short crosslink providing at least one short crosslink communication channel for passing data between said second transmit payload satellite and said second receive payload satellite, thereby forming a second transmit and receive payload pair;

establishing at least one downlink communication channel between said second transmit payload satellite and a second communication unit; and establishing at least one long crosslink communication channel between said first transmit payload satellite and said second receive payload satellite, thereby coupling said first transmit and receive payload pair to said second transmit and receive payload pair so that communication service data sent from said first communication unit is received by said second communication unit, wherein said communication service data is sent over said at least one uplink communication channel, said first short crosslink, said at least one long crosslink communication channel, said second short crosslink, and said at least one downlink communication channel.

2. The method of providing communication services as claimed in claim 1 wherein said first locations and said second locations are in geosynchronous orbits around the earth.

3. The method of providing communication services as claimed in claim 1 wherein said first locations and said second locations are in non-geosynchronous orbits around the earth.

4. The method of providing communication services as claimed in claim 1 wherein said first locations are in geosynchronous orbits around the earth and said second locations are in non-geosynchronous orbits around the earth.

5. The method of providing communication services as claimed in claim 1 wherein said first locations are in non-geosynchronous orbits around the earth and said second locations are in geosynchronous orbits around the earth.

6. The method of providing communication services as claimed in claim 1 wherein said establishing a first short crosslink step comprises the step of:

providing said first short crosslink using at least one electromagnetic signal means.

7. The method of providing communication services as claimed in claim 1 wherein said establishing a first short crosslink step comprises the step of:

providing said first short crosslink using at least one laser signal means.

8. The method of providing communication services as claimed in claim 1 wherein said establishing a second short crosslink step comprises the step of:

providing said second short crosslink using at least one electromagnetic signal means.

9. The method of providing communication services as claimed in claim 1 wherein said establishing a second short crosslink step comprises the step of:

providing said second short crosslink using at least one laser signal means.

10. The method of providing communication services as claimed in claim 1 wherein said establishing at least one long crosslink communication channel step comprises the step of:

providing said at least one long crosslink communication channel using at least one electromagnetic signal means.

11. The method of providing communication services as claimed in claim 1 wherein said establishing at least one long crosslink communication channel step comprises the step of:

providing said at least one long crosslink communication channel using at least one laser signal means.

12. The method of providing communication services as claimed in claim 1 further comprising the steps of:

providing at least one command link between said first transmit and receive payload pair and at least one system control center; and providing at least one telemetry link between said first transmit and receive payload pair and said at least one system control center.

13. The method of providing communication services as claimed in claim 1 further comprising the steps of:

providing at least one command link between said second transmit and receive payload pair and at least one system control center; and providing at least one telemetry link between said second transmit and receive payload pair and said at least one system control center.

14. In a satellite communication system which uses a plurality of transmit and receive payload pairs, which are coupled to each other via long crosslinks, to provide communication services to a plurality of communication units, a method of operating a receive payload satellite in a transmit and receive payload pair, said method comprising the steps of:

configuring said receive payload satellite to perform substantially all of the uplink receiving and processing functions and substantially none of the associated downlink transmitting functions;

positioning said receive payload satellite in a first location in orbit around the earth wherein said first location is chosen to separate high power transmitter operations associated with at least one transmit payload satellite at a second location in orbit from sensitive receive operations associated with said receive payload satellite;

receiving uplink received signals from at least one of said plurality of communication units;

converting said uplink received signals into uplink received data;

receiving crosslink received signals from at least one transmit payload satellite in another transmit and receive payload pair, said transmit and receive payload pair being coupled to said another transmit and receive payload pair using a long crosslink;

converting said crosslink received signals into crosslink received data;

processing said uplink received data and crosslink received data into payload data and crosslink transmitted data;

converting said crosslink transmitted data into crosslink transmitted signals;

sending said crosslink transmitted signals to a transmit payload satellite via a short crosslink, said short crosslink coupling said transmit payload satellite to said receive payload satellite, thereby forming said transmit and receive payload pair; and using some of said payload data to control said receive payload satellite.

15. The method of operating a receive payload satellite as claimed in claim 14, further comprising the steps of:

receiving uplink command signals from at least one system control center;

converting said uplink command signals into uplink command data; and processing said uplink command data into said payload data and said crosslink transmitted data.

16. In a satellite communication system which uses a plurality of transmit and receive payload pairs, which are coupled to each other via long crosslinks, to provide communication services to a plurality of communication units, a method of operating a transmit payload satellite in a transmit and receive payload pair, said method comprising the steps of:

configuring said transmit payload satellite to perform substantially all of the downlink transmitting functions and substantially none of the associated uplink receiving functions;

positioning said transmit payload satellite in a second location in orbit around the earth, wherein said second location is chosen to separate high power transmitter operations associated with said transmit payload satellite at said second location from sensitive receive operations associated with at least one receive payload satellite at a first location in orbit around the earth;

establishing a short crosslink to a receive payload satellite, said short crosslink coupling said transmit payload satellite to said receive payload satellite to form said transmit and receive payload pair;

receiving crosslink received signals from said receive payload satellite via said short crosslink;

converting said crosslink received signals into crosslink received data;

using said crosslink received data to determine payload data, crosslink transmitted data, and downlink transmitted data;

using said payload data to control said transmit payload satellite;

converting said crosslink transmitted data into crosslink transmitted signals;

establishing a long crosslink to a receive payload satellite in a different orbital plane, said long crosslink coupling said transmit payload satellite in said transmit and receive payload pair to said receive payload satellite which is in another transmit and receive payload pair;

transmitting said crosslink transmitted signals to said receive payload satellite in said another transmit and receive payload pair via said long crosslink;

converting said downlink transmitted data into downlink transmitted signals; and transmitting said downlink transmitted signals to at least one of said plurality of communication units.

17. The method of operating a transmit payload satellite as claimed in claim 16, further comprising the steps of:

using said crosslink received data to determine downlink telemetry data;

converting said downlink telemetry data into downlink telemetry signals; and transmitting said downlink telemetry signals to at least one system control center.

18. A satellite communication system which uses a plurality of transmit and receive payload pairs, which are coupled to each other via long crosslinks, to provide communication services to a plurality of communication units, a transmit and receive payload pair comprising:

a receive payload satellite comprising means for receiving signals via uplink communication channels from said plurality of communication units, said means for receiving including an uplink antenna that has been optimized to operate in a receive-only mode when said receive payload satellite is positioned in a first orbit around the earth, means for transmitting signals via short crosslink communication channels to a transmit payload satellite in said transmit and receive payload pair, means for receiving signals via long crosslink communication channels from a second transmit payload satellite in a second transmit and receive payload pair, and means for performing a first set of space-based processing functions required to provide said communication services, said first set comprising on-board processing functions for said receive payload satellite and substantially all processing functions for said transmit payload satellite in said transmit and receive payload pair; and a transmit payload satellite comprising means for transmitting signals via downlink communication channels to said plurality of communication units, said means for transmitting including a downlink antenna that has been optimized to operate in a transmit-only mode when said transmit payload satellite is positioned in a second orbit around the earth, means for receiving signals via short crosslink communication channels from a receive payload satellite in a transmit and receive payload pair, means for transmitting signals via long crosslink communication channels to another receive payload satellite in another transmit and receive payload pair, and means for performing a second set of space-based processing functions required to provide said communication services, wherein said first orbit and said second orbit are chosen to physically separate high power transmitter operations associated with said transmit payload satellite from sensitive receive operations associated with said receive payload satellite.

19. The satellite communication system as claimed in claim 18 wherein said receive payload satellites further comprise:

means for converting uplink received signals from at least one of said plurality of communication units into uplink received data;

means for converting crosslink transmitted data into crosslink transmitted signals;

means for converting crosslink received signals which are received on at least one long crosslink communication channel into crosslink received data; and a processing unit for processing said uplink received data, said crosslink received data, payload data, and said crosslink transmitted data.

20. The satellite communication system as claimed in claim 18, wherein said transmit payload satellites further comprise:

means for converting downlink transmitted data into downlink transmitted signals.

21. The satellite communication system as claimed in claim 18 further comprising:

a system control center with a command channel to at least one receive payload satellite in one of said plurality of transmit and receive payload pairs and with a telemetry channel from at least one transmit payload satellite in a second one of said plurality of transmit and receive payload pairs for controlling operations of said satellite communication system.

22. In a satellite communication system which uses a plurality of transmit and receive payload pairs, which are coupled to each other via long crosslinks, to provide communication services to a plurality of communication units, wherein a transmit and receive payload pair comprises a receive payload satellite and a transmit payload satellite that are coupled to each other using a short crosslink communication channel, said receive payload satellite comprising:

an uplink antenna for receiving uplink received signals from at least one of said plurality of communication units, said uplink antenna being optimized to operate in a receive-only mode at a first location in orbit around the earth, wherein said first location is chosen to separate high power transmitter operations associated with at least one transmit payload satellite at a second location in orbit from sensitive receive operations associated with said receive payload satellite;

an uplink receiver unit coupled to said uplink antenna for converting said uplink received signals from at least one of said plurality of communication units into uplink received data; performs substantially all space-based receiving functions that are required to provide said communication services said uplink receiver unit being optimized to operate at said first location;

a crosslink antenna unit for providing said short crosslink communication channel between said receive payload satellite and said transmit payload satellite in said transmit and receive payload pair, said transmit payload satellite being in a second location in orbit around the earth and for providing at least one long crosslink communication channel between said receive payload satellite and at least one other transmit payload satellite in another transmit and receive payload pair;

a crosslink receiver unit coupled to said crosslink antenna unit for converting crosslink received signals into crosslink received data;

a crosslink transmitter unit coupled to said crosslink antenna unit for converting crosslink transmitted data into crosslink transmitted signals; and a processing unit coupled to said uplink receiver unit, to said crosslink receiver unit, and to said crosslink transmitter unit for processing said uplink received data, said crosslink received data, said crosslink transmitted data, and payload data, said processing unit providing all on-board processing functions for said receive payload satellite and substantially all processing functions for said transmit payload satellite in said transmit and receive payload pair.

23. In a satellite communication system which uses a plurality of transmit and receive payload pairs, which are coupled to each other via long crosslinks, to provide communication services to a plurality of communication units, wherein a transmit and receive payload pair comprises a receive payload satellite and a transmit payload satellite that are coupled to each other using a short crosslink communication channel, said transmit payload satellite comprising:

a downlink antenna for transmitting downlink transmitted signals to at least one of said plurality of communication units, said downlink antenna being optimized to operate in a transmit-only mode at a second location in orbit around the earth, wherein said second location is chosen to separate high power transmitter operations associated with said transmit payload satellite at said second location from sensitive receive operations associated with at least one receive payload satellite at a first location in orbit around the earth;

a downlink transmitter unit coupled to said downlink antenna for converting downlink transmitted data into said downlink transmitted signals, said downlink transmitter unit performing substantially all associated space-based transmitting functions that are required to provide said communication services and substantially none of space-based receiving functions that are required to provide said communication services;

a crosslink receiver unit coupled to said downlink transmitter unit for converting crosslink received signals into crosslink received data, wherein said crosslink received signals are received on said short crosslink communication channel from said receive payload satellite of said transmit and receive payload pair, said crosslink received data comprising instructional data from said receive payload satellite which said transmit payload satellite uses to modify its operations;

a crosslink transmitter unit coupled to said crosslink receiver unit for converting crosslink transmitted data into crosslink transmitted signals which are transmitted on at least one long crosslink communication channel between said transmit payload satellite and at least one other receive payload satellite in another transmit and receive payload pair; and a crosslink antenna unit coupled to said crosslink receiver unit for providing said short crosslink communication channel and to said crosslink transmitter unit for providing said at least one long crosslink communication channel.

\* \* \* \* \*